United States Patent
McConnell et al.

(10) Patent No.: US 6,633,636 B1
(45) Date of Patent: Oct. 14, 2003

(54) INTEGRATED WIRELESS AND PRIVATE BRANCH EXCHANGE COMMUNICATION NETWORK

(75) Inventors: Von McConnell, Leawood, KS (US); Doreen D. Weiland, Lake Latawana, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 0 days.

(21) Appl. No.: 09/322,780

(22) Filed: May 28, 1999

(51) Int. Cl.[7] .............................. H04M 7/00; H04Q 7/20; H04B 1/38
(52) U.S. Cl. ..................... 379/220.01; 379/221.15; 455/445; 455/461; 455/555
(58) Field of Search .................... 379/219, 220.01, 379/221.01, 221.15, 229, 230; 370/310, 351, 352; 455/417, 445, 461, 555, 560

(56) References Cited

U.S. PATENT DOCUMENTS

| | | | |
|---|---|---|---|
| 4,191,860 A | | 3/1980 | Weber ..................... 379/115.01 |
| 5,247,571 A | | 9/1993 | Kay et al. ............... 379/221.09 |
| 5,303,285 A | | 4/1994 | Kerihuel et al. ............ 455/461 |
| 5,353,331 A | | 10/1994 | Emery et al. ................ 455/461 |
| 5,655,001 A | * | 8/1997 | Cline et al. ................. 370/328 |
| 5,694,463 A | | 12/1997 | Christie et al. .......... 379/221.09 |
| 5,999,810 A | * | 12/1999 | Fuentes ...................... 455/422 |
| 6,014,377 A | * | 1/2000 | Gillespie .................... 370/310 |
| 6,073,029 A | * | 6/2000 | Smith et al. ................ 455/461 |
| 6,223,055 B1 | * | 4/2001 | Cyr ............................ 455/555 |

* cited by examiner

Primary Examiner—Benny Tieu

(57) ABSTRACT

An interface assembly (18) for integrating operation of a private telecommunications system (12) such as a PBX with a wireless intelligent network (14) such as the PCS network operated by Sprint PCS. The interface assembly includes an interface (54) for coupling with the private telecommunications system, an interface (56) for coupling with a component of the wireless intelligent network, and a controller (58) for processing and transferring call routing queries and instructions therebetween. The private telecommunications system interface is operable to receive call routing queries from the private telecommunications system and to deliver call routing instructions to the private telecommunications system. The wireless network interface is operable to deliver call routing queries to the wireless network and to receive call routing instructions from the wireless network. The controller is coupled with the interfaces and operable to control routing of a call received by the private telecommunications system by sending a call routing query to the component of the wireless network when triggered by the private telecommunications system, receiving call routing instructions from the component of the wireless network in response to the call routing query, and routing the call in accordance with the received call routing instructions.

26 Claims, 3 Drawing Sheets

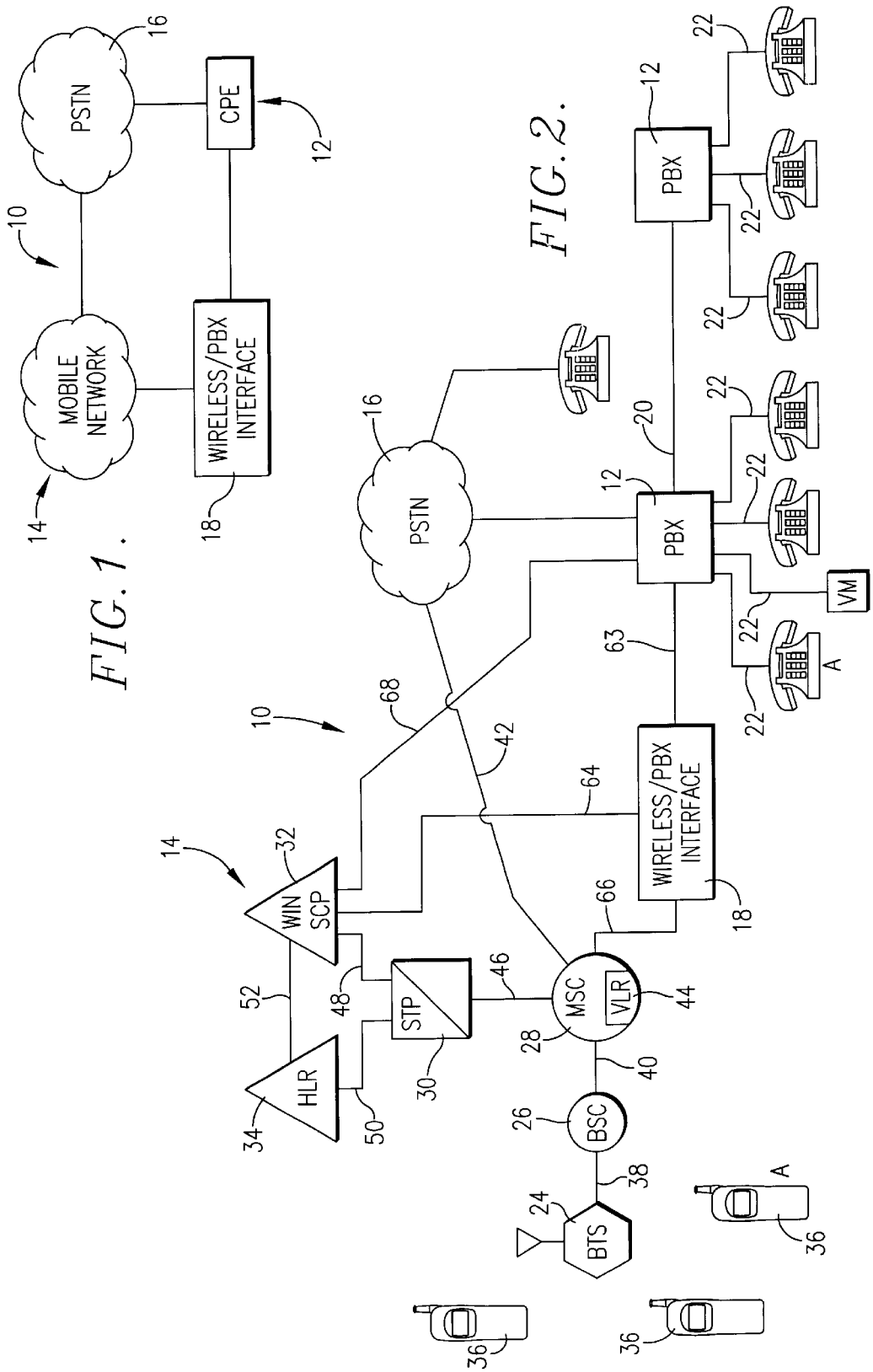

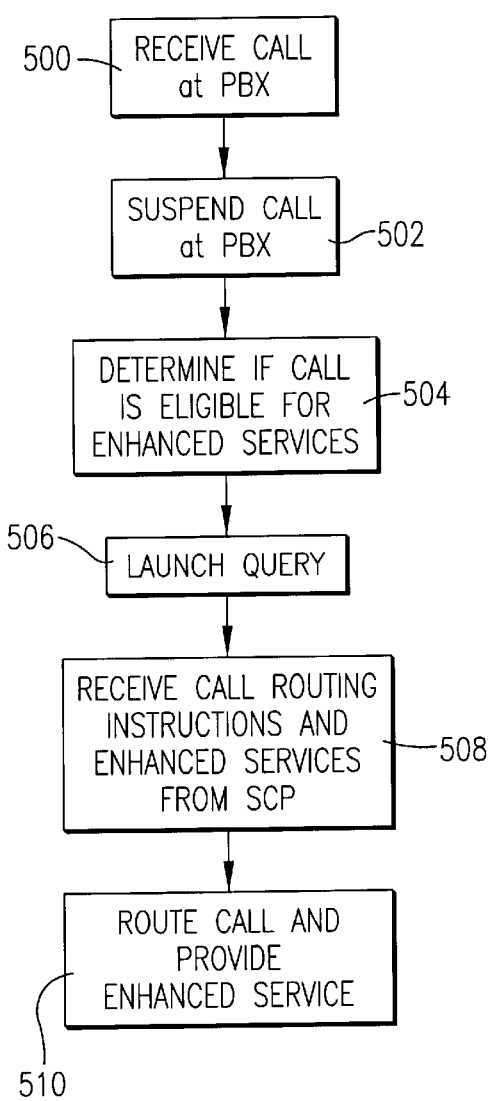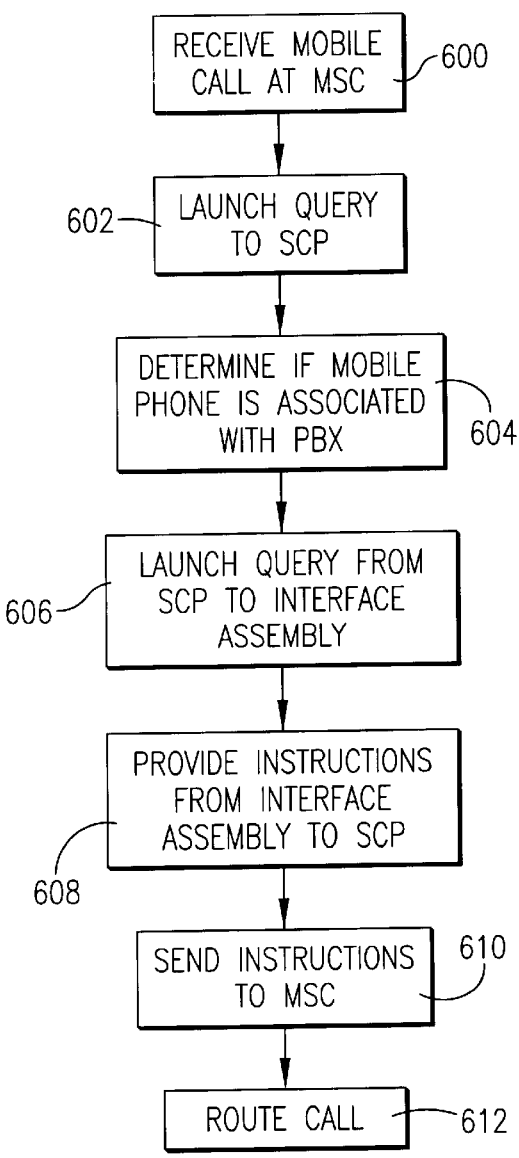

INTEGRATED WIRELESS AND PRIVATE BRANCH EXCHANGE COMMUNICATION NETWORK

BACKGROUND OF THE INVENTION

1. Field of the Invention

The present invention relates to telecommunications, and in particular, to an interface assembly for seamlessly integrating operation of a private telecommunications system with a wireless intelligent network to provide more efficient call routing and enhanced communication services to the private telecommunications system.

2. Description of the Prior Art

Many organizations purchase and operate their own private telecommunications systems such as private branch exchanges (PBXs) rather than subscribing to their local telephone company's Centrex services because PBXs offer many advantages such as reduced operating costs, increased routing configuration flexibility, and more enhanced services. Many organizations also provide their employees, customers, and others with mobile phones so that they can be reached while traveling or otherwise away from their landline extensions.

Unfortunately, however, existing private telecommunications systems and wireless networks operate over separate and distinct networks that are not integrated, necessitating the assignment of two phone numbers and possibly two voice mails to every user: one for their landline extensions and one for their mobile phone. This obviously makes it difficult to quickly call a person served both by a private telecommunications system and a wireless network because it is impossible to determine which phone, if either, the person is currently using.

Wireless PBXs that integrate some of the traditional functions of a landline PBX with wireless phones have recently been developed. However, these wireless PBXs are expensive, and many companies are reluctant to replace their existing landline private telecommunications systems with new wireless PBXs because of the large investments they have already made in their existing systems.

Another problem with existing private telecommunications systems is that many cannot be programmed or configured to offer enhanced calling and routing services that have been recently made available. Thus, to offer these new calling and routing services, organizations must either buy new private telecommunications systems or extensively modify their existing systems. Once again, many organizations are reluctant to do so because of the large investments they have already made in their existing systems.

SUMMARY OF THE INVENTION

The present invention solves the above-described problems and provides a distinct advance in the art of telecommunications. More particularly, the present invention provides an interface assembly that integrates a wireless telecommunications network with a customer-owned private telecommunications system such as a PBX to obtain virtually seamless operation of the two networks without requiring the owner of the private system to purchase new equipment. The interface assembly of the present invention also controls and administers the operation and routing of an existing landline private telecommunications system by using the intelligence of a wireless intelligent network, thus providing enhanced operating and routing services to the private telecommunications system. The interface assembly also uses the embedded programming in an existing private telecommunications system to assist in routing calls over a wireless network.

The interface assembly of the present invention broadly includes an interface for coupling with a private telecommunications system, an interface for coupling with a wireless intelligent network, and a controller for processing and transferring call routing queries and instructions therebetween. The private telecommunications system interface is operable to receive call routing queries from and to deliver call routing instructions to the private telecommunications system. The wireless network interface is operable to deliver call routing queries and to receive call routing instructions from the wireless network. The controller is coupled with the interfaces and is operable to control routing of a call received by the private telecommunications system by: sending a call routing query to the component of the wireless network when triggered by the private telecommunications system; receiving call routing instructions from the component of the wireless network in response to the call routing query; and routing the call in accordance with the received call routing instructions. The controller also permits the wireless network to control the routing of wireless calls based on instructions programmed in the private telecommunications system.

The interface assembly may be configured to operate as an auto attendant, automatic call distributor, peer-to-peer agent, or computer telephony interface of the private telecommunications system or as a service node or intelligent peripheral residing on the wireless intelligent network. The interface preferably communicates with the private telecommunications system over a package switch or Integrated Services Digital Network (ISDN) data link and functions in a peer-to-peer relationship with the private telecommunications system.

In one application of the present invention, the interface assembly provides seamless operation of an organization's private telecommunications system landline phones and wireless phones. For example, an organization such as a hotel may provide certain customers with a mobile phone along with a landline phone in the customer's hotel room. When an incoming call is received at the private telecommunications system for the customer, the private telecommunications system initially suspends the call and determines whether the landline extension associated with the incoming call can receive the call. At the same time, the interface assembly launches a call routing query to a service control point of the wireless network to determine whether the mobile phone number associated with the incoming call is available to receive the call and to obtain location register information relating to the mobile phone. If both the landline extension and mobile phone are available to receive the incoming call, the private telecommunications system simultaneously rings both phones and then connects the incoming call to the phone that is answered first.

In another application of the present invention, the interface assembly uses the intelligence of a wireless network to provide enhanced services to a private telecommunications system. For example, the interface assembly and the private telecommunications system to which it is coupled may be programmed so that the private telecommunications system suspends a received call and signals the interface assembly. The interface assembly then determines if the call is eligible for an enhanced service provided by the integrated network and sends a call routing query to a service control point of the wireless network if it is. The service control point responds with call routing instructions and enhanced services as requested by the interface assembly and private telecommunications system. The interface assembly and private telecommunications system then route the call or provide certain enhanced services in accordance with the call routing instructions received from the service control point.

By providing an interface assembly and an integrated network configured in accordance with the present invention, an organization can seamlessly integrate operation of its landline phone extensions with its wireless phones. Specifically, members or customers of the organization can be assigned a single phone number, and the private telecommunications system and interface assembly can connect a call to that person using the single phone number regardless of which phone the person is currently using. Additionally, the interface assembly of the present invention allows the intelligence of a wireless network to be used to control and administer the operation of an existing landline private telecommunications system. For example, enhanced services and routing capabilities provided by the wireless network that are not normally available to the private telecommunications system can be provided without reconfiguring or replacing the PBX. Similarly, the interface assembly allows the embedded programming and routing instructions in a private telecommunications system to be used by a wireless intelligent network to control the routing and handling of wireless calls. This allows the operator of the private telecommunications system to control the routing or services of wireless calls by merely programming the private telecommunications system.

BRIEF DESCRIPTION OF THE DRAWING FIGURES

A preferred embodiment of the present invention is described in detail below with reference to the attached drawing figures, wherein:

FIG. 1 is a schematic diagram broadly illustrating one embodiment of the integrated wireless and private branch exchange communications network of the present invention.

FIG. 2 is a more specific schematic diagram of one embodiment of the integrated wireless and private branch exchange communications network of the present invention.

FIG. 5 is a flow diagram illustrating the steps in another application of the present invention.

FIG. 6 is a flow diagram illustrating the steps in another application of the present invention.

DETAILED DESCRIPTION OF THE PREFERRED EMBODIMENTS

System Architecture

Figure 3:
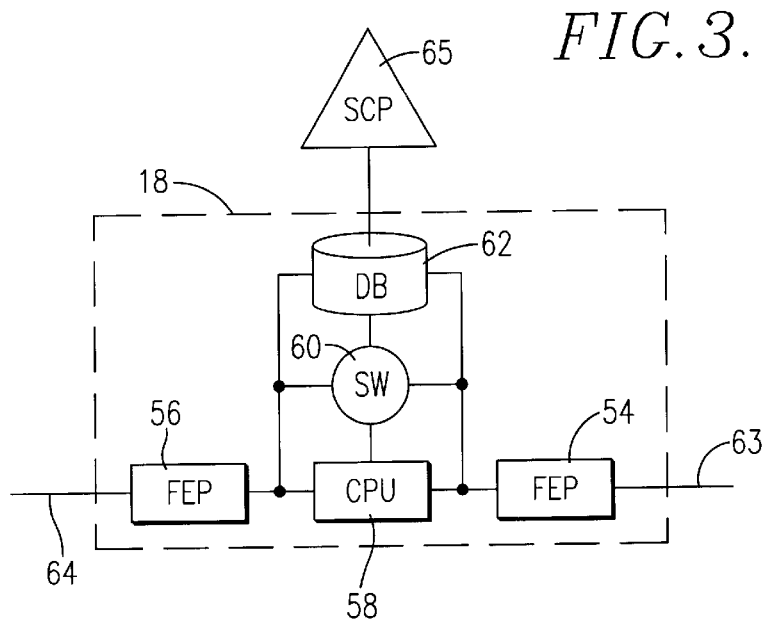
FIG. 3 is a schematic diagram illustrating the components of the wireless/PBX interface assembly of the present invention.

Turning now to the drawing figures, an integrated telecommunications network 10 configured in accordance with a preferred embodiment of the present invention is illustrated. As shown generally in FIG. 1, the integrated network broadly includes private, customer premise telecommunications equipment (CPE) 12, a wireless intelligent network 14, a public switched telephone network (PSTN) 16, and a wireless/PBX interface assembly 18, all connected by signaling data links and trunk circuits as described in more detail below.

FIG. 2 illustrates the components of the integrated network 10 in more detail. The CPE 12 may be any privately owned and operated telecommunications system such as a conventional private branch exchange (PBX). The CPE may include a single PBX or a plurality of PBXs interconnected by public or private switched networked lines 20. Each PBX serves a plurality of extensions 22 each connected to a phone or other communications device such as a modem or a voice mail device.

The wireless intelligent network 14 is preferably a code division multiple access (CDMA) Personal Communication Service (PCS) wireless intelligent network such as the PCS network owned and operated by Sprint Spectrum L.P., a multipoint, multichannel distribution service known as Sprint PCS, but may also be an advanced mobile phone service (AMPS) network, time division multiple access (TDMA) network, local multipoint distribution service (LMDS) or other conventional wireless network. The preferred network broadly includes a base station (BTS) 24, a base station controller (BSC) 26, a mobile switching center (MSC) 28, a signal transfer point (STP) 30, a wireless intelligent network service control point (WIN SCP) 32, and a home location register (HLR) 34, all interconnected by signaling data links and trunk circuits as described below.

The BTS 24, which is well known in the art, provides wireless communications to and from a plurality of mobile stations 36 such as PCS or AMPS phones located in a telecommunications cell. The preferred telecommunications cell is part of a CDMA PCS telecommunications network such as the Sprint PCS network described above. The BTS includes a plurality of transceivers coupled with one or more antennas that together provide wireless communications within the cell. The BTS is preferably operable to control transmission and reception of code division multiple access (CDMA) PCS traffic independently over three sectors using selected ones of a defined set of CDMA codes for each sector. The CDMA codes may include, for example, 64 Walsh codes. An example of a BTS that may be used with the present invention is the Nortel CDMA Outdoor 1900 MHZ base station. Those skilled in the art will appreciate that the wireless intelligent network 14 includes numerous BTSs positioned in telecommunications cells throughout the country.

The BSC 26 is coupled with the BTS 24 and other base stations located in nearby telecommunications cells with signaling data links and trunk circuits 38 to control operation thereof. The BSC basically multiplexes electric signals from a plurality of BTSs into transmission signals that are sent to the MSC 28. The BSC also routes network signals and calls from other components of the wireless network to the appropriate BTS for transmission to the mobile stations 36. The BSC is preferably manufactured by Lucent, Nortel or Motorola.

The MSC 28 is coupled with the illustrated BSC and other base station controllers with signaling data links and trunk circuits 40 to provide switching between the wireless network 14 and other MSCs. The MSC coordinates the establishment of calls to and from the mobile stations and is responsible for transmission facilities management, mobility management, and call processing. The MSC is also connected with the PSTN by trunk circuits 42 to route calls to and from the private telecommunications systems. The MSC is preferably manufactured by Lucent, Nortel or Motorola.

The MSC 28 includes a visitor location register (VLR) 44 or is coupled with a stand-alone VLR. The VLR includes a database that contains information relating to visiting users of the wireless intelligent network such as users' location, status and service information, all of which is derived from the HLR 34. The MSC accesses the VLR to retrieve information for the handling of calls to and from visiting users. A visitor is typically a wireless network subscriber who is roaming in a non-home or visiting telecommunications cell or a subscriber of another wireless network. The VLR may serve one or more MSCs.

The STP 30 is connected between the MSC and the WIN SCP by signaling data links 46, 48 and is operable to route signaling messages therebetween. STPs are well known in the art with an example being the digital switch corporation (DSC) Megahub.

The WIN SCP 32 is coupled with the STP 30 by signaling data links 48 to exchange signaling messages with the MSC and other mobile switching centers. The WIN SCP, which is well known in the art, preferably uses TCAP protocols to perform transaction processing for wireless calls. However, other signaling systems or means to exchange messages are equally applicable to the present invention. The WIN SCP also includes a plurality of databases for providing intelligence and certain enhanced services to the wireless network as described herein. An example of an SCP that may be used with the present invention is a switch manufactured by Telcordia.

The HLR 34 may be a database residing on the WIN SCP 32 or may be a stand-alone database servicing several SCPs. Alternatively, the HLR may be coupled with the WIN SCP by a signaling data link 52. In either case, the HLR includes a database containing subscriber data and information used to identify a user of the wireless intelligent network and relating to features and services available to the subscriber. An HLR that may be used with the present invention is manufactured by Lucent.

The HLR represents the "home" database for subscribers and contains a record for each home subscriber that includes location information, subscriber status, subscribed features, and directory numbers. The HLR is also used to verify a user and to support mobility management features to which the user has subscribed when that user is roaming outside of his home area. In a roaming scenario, the home MSC for the user queries the HLR via a signaling link 50 or 52 to verify the user. Once verified, the data for the user is transferred from the HLR via signaling to the VLR positioned at the MSC where the user is currently roaming. The VLR maintains the visitor information while the user is active in that cell and discards it later.

As is well known in the art, the MSC 28, STP 30, WIN SCP 32 and HLR 34 all communicate via out of band signaling, typically using Signaling System #7 (SS7) or TCP/IP protocols to facilitate the routing of calls through the wireless network. The signaling allows the wireless intelligent network to exchange information over the network elements to more quickly and efficiently route calls over the network.

The PSTN 16 refers to the entire local, long distance, and international landline phone system used in the United States. The PSTN includes well known components such as central office local exchange carriers (LECs) and interexchange carriers (IXCs). Although the integrated network of the present invention may be interconnected with any local exchange carrier or central office, the present invention provides particular advantages when the PBX or other private telecommunications system is connected to a central office having limited intelligent network capabilities. Therefore, the private telecommunications system 12 and wireless intelligent network 14 illustrated and described herein are preferably coupled with a central office switch providing only POTS phone service.

In accordance with the present invention, the wireless/PBX interface assembly 18 is coupled between the private telecommunications system 12 and the wireless intelligent network 14 to operate as an interface between the two networks. In a preferred embodiment of the present invention, the interface assembly: integrates the operation of the wireless intelligent network and the customer-owned private telecommunications system to obtain virtually seamless operation of the two networks; controls and administers the operation and routing of the private telecommunications system by using the intelligence embedded in the wireless network to provide enhanced operating services; and uses the embedded programming and routing instructions in the private telecommunications system to control the routing and handling of calls directed thereto but destined for the wireless network.

The interface assembly 18 may be configured to operate as an auto attendant, automatic call distributor, peer-to-peer agent, or computer telephony interface of the private telecommunications system or as a service node or intelligent peripheral residing on the wireless intelligent network. Although the interface preferably functions in a peer-to-peer relationship with the private telecommunications system, it may be resident on either the private telecommunications system or the wireless network or may be a separate, stand-alone component.

As illustrated in FIG. 3, one embodiment of the interface assembly 18 includes a pair of front end processors (FEPs) 54, 56, a controller 58, a digital switch 60, and one or more databases 62. The interface assembly may also have access to one or more external databases 65. The FEP 54 serves as an interface for coupling the interface assembly 18 with the private telecommunications system 12. The FEP 54 preferably interfaces with the private telecommunications system with a data link 63 using existing interfaces residing on conventional PBXs such as H.323 packet switched interfaces, PRI/ISDN interfaces, T1 interfaces, or MF in-band signaling interfaces. However, other interfaces or signaling is equally applicable to the present invention. This allows the interface assembly to function in a peer-to-peer relationship with the PBX as discussed in more detail below. The FEP 54 is operable to receive call routing queries from and deliver call routing instructions to the private telecommunications system as described below.

The FEP 56 serves as an interface for coupling with one or more components of the wireless intelligent network 14. As illustrated in FIGS. 2 and 3, the FEP is preferably coupled with the WIN SCP by a TCP/IP data link 64 or other signaling data link such as SS7, C7, or X.25. The FEP is also connected with the MSC 28 by conventional trunk circuits 66 for routing calls therebetween. The FEP is operable to deliver call routing queries to the wireless network and to receive call routing instructions from the wireless network as described below.

The FEP 54 and FEP 56 may be integrated as one device or be separate devices. In one embodiment of the invention, the FEPs are Tandem computing devices such as the Tandem ST-2000.

The controller 58, digital switch 60, and database 62 of the interface assembly 18 are coupled between the two FEPs 54, 56 and are operable to control routing of calls received by the private telecommunications system. Particularly, and as described in more detail below, the components send messages to the WIN SCP when triggered by the private telecommunications system; receive call routing instructions and other messages from the WIN SCP in response to informational queries; and route the calls and/or provide enhanced services in accordance with the received instructions.

Operation

Figure 4:
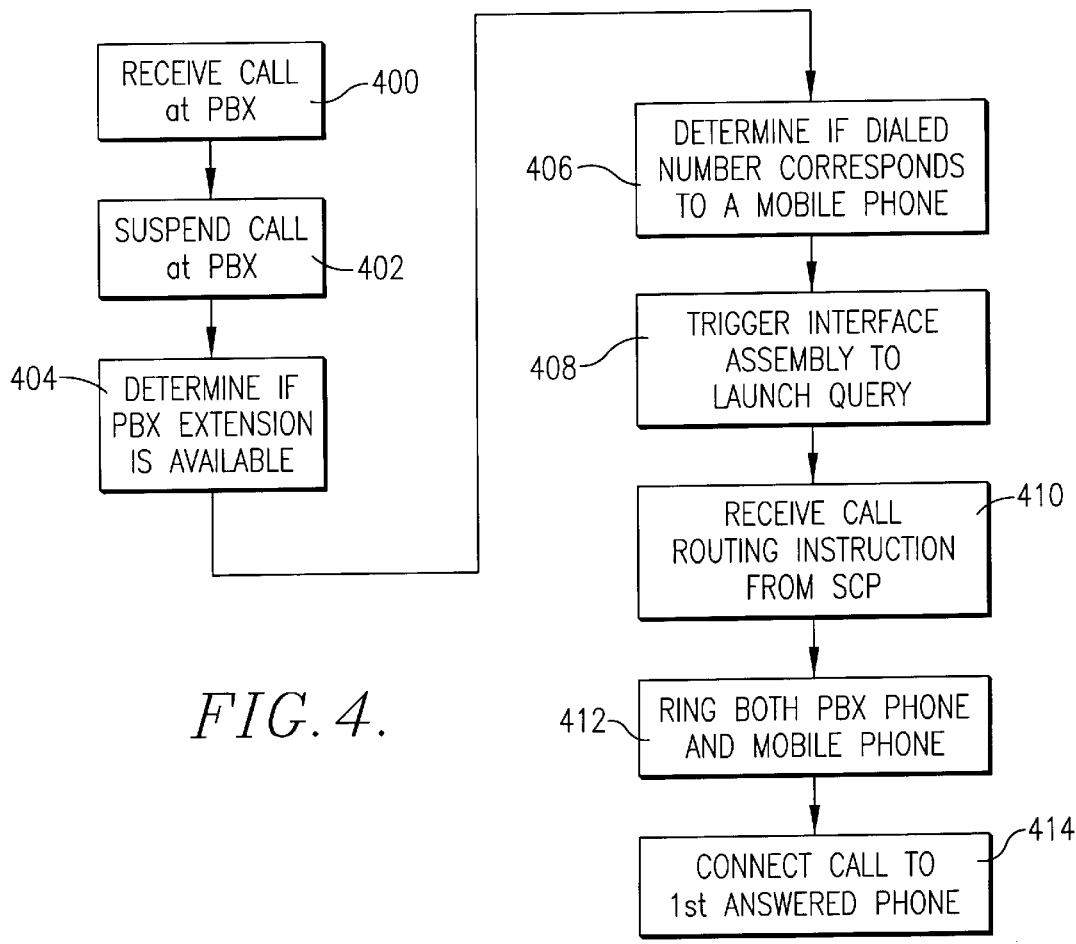
FIG. 4 is a flow diagram illustrating the steps in one application of the present invention.

FIG. 4 depicts the steps involved in one application of the present invention wherein the interface assembly 18 provides seamless operation of an organization's PBX landline phones and wireless phones. In this application, an organization such as a hotel provides a mobile phone "A" to a customer along with a landline phone "A" in the customer's hotel room. When a call is received at the PBX 12 for the customer from one of the other PBX extensions or a phone not serviced by the PBX, the PBX initially suspends the call as depicted in steps 400, 402. The PBX then determines whether the landline extension associated with the incoming call can receive the call (i.e., whether the line is busy) as depicted in step 404. At the same time or subsequently, the PBX triggers the interface assembly 18 to determine whether the dialed number corresponds to a person who has been assigned a mobile phone as depicted in step 406. If it does, the interface assembly launches a call routing query to the SCP 32 to determine whether the mobile phone number associated with the incoming call is available to receive the call and to obtain location register information and routing instructions as depicted in step 408. Alternatively, the interface assembly may initially query the SCP to determine whether the dialed number corresponds to a mobile phone and to obtain location and routing information. The SCP responds by sending the interface assembly the requested data as depicted in step 410. If both the PBX extension and mobile phone are available to receive the incoming call, the PBX and MSC 28 simultaneously ring both phones and then connect the incoming call to the phone that is answered first as depicted in steps 412–414. Connection to the mobile phone could be accomplished via routing the call to the PSTN or allowing the PBX to switch the call to the MSC serving the mobile handset.

FIG. 5 depicts the steps in another application of the present invention wherein the interface assembly 18 uses the intelligence of the wireless network 14 to provide enhanced services not normally provided by the private telecommunications system to an extension of the system. In this application, the private telecommunications system is programmed to initially suspend a received call as depicted in steps 500 and 502. The interface assembly is also programmed to recognize a number of triggers such as an originating telephone number to indicate that a call should be treated as an integrated or special service call. This allows the PBX to trigger the interface assembly to determine if the call is eligible for an enhanced service provided by the integrated network as depicted in step 504. If it is, the interface assembly sends a call routing query to the SCP 32 as depicted in step 506. The SCP responds with call routing instructions so as to provide certain enhanced services such as voice mail, call forwarding, abbreviated dialing, hunt group, etc. as requested by the interface assembly and private telecommunications system as depicted in step 508.

For example, if the PBX 12 receives an incoming call for one of the stations of the PBX and that station is busy, the interface assembly will determine from the destination telephone number whether the station is entitled to certain enhanced services. If it is, the interface assembly sends a call routing query to the SCP 32 to determine how to handle the call. The SCP responds to the call routing query sent by the interface assembly by sending the private telecommunications system routing instructions to route the call to an alternate number or to a voice mail system resident on the wireless network. The private telecommunications system then routes the call or provides the enhanced services in accordance with the call routing instructions received from the service control point as depicted in step 510.

As an example of an enhanced service that may be offered to the PBX, a user of phone "A" of the PBX may dial an abbreviated number such as "1234." The PBX would suspend this call and trigger the interface assembly to determine if the originating phone is eligible for an abbreviated dialing service. If the interface assembly determines that phone "A" is eligible for the service, it sends a signaling query to the SCP. The SCP then determines the full phone number associated with the abbreviated number and returns it to the interface assembly, which in turn provides it to the PBX for routing the call. This allows an existing PBX to provide an abbreviated dialing service by using the existing intelligence of the wireless intelligent network.

FIG. 6 depicts yet another application of the present invention wherein the interface assembly 18 uses the embedded programming of the PBX 12 to assist in the routing and handling of wireless calls over the wireless intelligent network 14. Assume that the private system is programmed with certain routing instructions or restrictions to be followed when processing calls made by any station on the private system or any wireless phone associated with the system. In this application, the WIN SCP 32, interface assembly 18, and PBX 12 are all programmed with triggers to identify mobile stations 36 that are associated with an extension of the private telecommunications system. This allows an organization such as a hotel to assign a customer a mobile phone "A" that he or she may use while staying at the hotel. When the customer attempts to make a wireless call from the phone, the MSC 28 receives the call request through the BSC 26 and BTS 24 in a conventional manner as depicted in step 600. The MSC then launches a query to the SCP 32 through the STP 30 to determine how to route the call as depicted in step 602. The SCP then determines if the mobile station "A" is part of the PBX network as depicted in step 604. If it is, the SCP launches a query to the interface assembly to send routing instructions from the interface assembly and the PBX as illustrated in step 606. The interface assembly and PBX then transmit routing instructions and other information to the SCP as depicted in step 608.

As an example of how the wireless network may use the intelligence of the private telecommunications system, the interface assembly 18 and PBX 12 may send instructions to the SCP 32 to provide the mobile phone "A" a certain amount of calling time or to restrict calls from the mobile phone "A" to only extensions on the PBX. The SCP then sends these routing and special instructions to the MSC 28 through the STP 30 as depicted in step 610 and the MSC controls the routing of the call from the mobile phone "A" in accordance with these instructions as depicted in step 612.

In another example of the interface assembly 18 using the embedded programming of the PBX 12 to assist in the routing of wireless calls, the MSC 28 may receive a call request from a mobile phone "A" through the BSC 26 and BTS 24 in a conventional manner. The MSC then launches a query to the SCP 32 through the STP to determine how to route the call. The SCP then determines if the mobile station "A" is a part of the PBX network. If it is, the SCP launches a message to the HLR such as a location request, search and/or modify feature request, or service request to determine if the destination phone is available. If the destination phone is not, the SCP launches a query to the interface assembly, which in turn triggers the PBX to obtain an alternate phone number to which the call should be connected. The interface assembly then sends this alternate number to the SCP, which in turn performs signaling to determine if the alternate phone number is available. If it is, the SCP provides signaling to the MSC through the STP to route the call to the alternate number.

By providing an interface assembly and integrated network configured as described above, an organization can seamlessly integrate operation of its landline PBX extensions with wireless phones. Specifically, members or customers of the organization can be assigned a single phone number, and the PBX and interface assembly can connect a call to that person using the single phone number regardless of which phone they are currently using. Additionally, the interface assembly of the present invention allows the intelligence of a wireless network to be used to control and administer the operation of an existing landline PBX. For example, enhanced services and routing capabilities provided by the wireless network that are not normally available to the PBX can be provided to the PBX users without reconfiguring or replacing the PBX. Similarly, interface assembly allows the embedded programming and routing instructions in the PBX to be used by the wireless intelligent network to control the routing and handling of wireless calls. This allows the operator of the PBX to control the routing of wireless calls associated with the PBX by merely programming the PBX.

In another embodiment of the invention, the WIN SCP 32 is connected directly to a TCP/IP interface of the PBX by a data link 68 so that the WIN SCP serves as an extension of the PBX.

Although the invention has been described with reference to the preferred embodiment illustrated in the attached drawing figures, it is noted that equivalents may be employed and substitutions made herein without departing from the scope of the invention as recited in the claims. For example, although the preferred embodiment of the interface assembly described herein integrates a wireless network with a landline private telecommunications system, it may also integrate a landline or wireless private telecommunications system with a landline or fixed wireless telecommunications network or may interface two separate wireless networks.

Having thus described the preferred embodiment of the invention, what is claimed as new and desired to be protected by Letters Patent includes the following:

1. An interface assembly for integrating operation of a private telecommunications system with a wireless intelligent network, the interface assembly comprising:
   a private telecommunications system interface for coupling with the private telecommunications system and operable to receive call routing queries from the private telecommunications system and operable to deliver call routing instructions to the private telecommunications system;
   a wireless network interface for coupling with a component of the wireless intelligent network and operable to deliver call routing queries to the wireless network and to receive call routing instructions from the wireless network; and
   a controller coupled with the interfaces and operable to control routing of a call initially routed to the private telecommunications system by sending a call routing query to the component of the wireless network when triggered by the private telecommunications system, receiving call routing instructions from the component of the wireless network in response to the call routing query, and routing the call in accordance with the received call routing instructions.

2. The interface assembly as set forth in claim 1, wherein the interface assembly resides on the wireless network.

3. The interface assembly as set forth in claim 1, the private telecommunications system being a private branch exchange.

4. The interface assembly as set forth in claim 1, the component of the wireless network being a service control point.

5. The interface assembly as set forth in claim 1, wherein the private telecommunications system interface is configured for coupling with the private telecommunications system with a data link selected from the group consisting of a packet switched data link, a PRI/ISDN data link, and a T1 data link.

6. The interface assembly as set forth in claim 1, wherein the wireless network interface is configured for coupling with the component of the wireless network with a high speed TCP/IP data link.

7. The interface assembly as set forth in claim 1, wherein the interface assembly is configured to interface with the private telecommunications system in a peer-to-peer relationship.

8. The interface assembly as set forth in claim 1, further including a digital switch coupled with the processor for routing calls to the wireless network from the private telecommunications system and to the private telecommunications system from the wireless network.

9. The interface assembly as set forth in claim 8, further including a database coupled with the processor and the digital switch for storing data relating to the routing of calls handled by the private telecommunications system.

10. The interface assembly as set forth in claim 1, wherein the interface assembly is configured to operate as an auto attendant of the private telecommunications system.

11. The interface assembly as set forth in claim 1, wherein the interface assembly is configured to operate as a computer telephony interface of the private telecommunications system.

12. The interface assembly as set forth in claim 1 wherein the interface assembly is configured to operate as a service node residing on the wireless network.

13. The interface assembly as set forth in claim 1 wherein the interface assembly is configured to operate as an intelligent peripheral residing on the wireless network.

14. A method of integrating operation of a private telecommunications system with a network to route calls originating from and directed to the private telecommunications system, the method comprising the steps of:
   initially routing a call to the private telecommunications system;
   temporarily suspending the call at the private telecommunications system;
   sending a message to a system operatively connected to the network;
   launching a call routing query to a component of the network;
   receiving at the private telecommunications system call routing instructions from the network in response to the query; and controlling routing of the call by the private telecommunications system in accordance with the call routing instructions received from the network.

15. The method set forth in claim 14, wherein the private telecommunications system is served by a POTS landline switch.

16. The method set forth in claim 14, the private telecommunications system being a private branch exchange.

17. The method as set forth in claim 14, the network being a wireless intelligent network.

18. The method set forth in claim 17, the system being a service control point.

19. The method set forth in claim 14, wherein the private telecommunications system and the network are operatively coupled by an interface assembly.

20. The method set forth in claim 19, wherein the interface assembly is configured to interface with the private telecommunications system in a peer-to-peer relationship.

21. The method set forth in claim 19, wherein the interface assembly is configured to operate as an auto attendant of the private telecommunications system.

22. The method set forth in claim 19, wherein the interface assembly is configured to operate as a computer telephony interface of the private telecommunications system.

23. The method set forth in claim 19, wherein the interface assembly is configured to operate as a service node residing on the network.

24. The method set forth in claim 19, wherein the interface assembly is configured to operate as an intelligent peripheral residing on the network.

25. A method of integrating operation of a private telecommunications system with a wireless telecommunications network, the method comprising the steps of:

programming the wireless network to associate a mobile phone with an extension of the private telecommunications system;

receiving a call request from the mobile phone at the wireless network;

launching a call routing query from the wireless network to the private telecommunications system;

receiving at the wireless network call routing instructions from the private telecommunications system in response to the query; and controlling routing of the call made by the mobile phone in accordance with the call routing instructions received from the private telecommunications system.

26. A method of integrating operation of a private telecommunications system with a wireless telecommunications network, the method comprising the steps of:

initially routing a call to the private telecommunications system;

temporarily suspending the call at the private telecommunications system;

determining whether an extension on the private telecommunications system corresponding to the call can receive the call;

launching a call routing query to the wireless network to determine whether a mobile phone associated with the extension is available to receive the call;

if both the extension on the private telecommunications system and the mobile phone are available to receive the incoming call, ringing both the extension and the mobile phone; and connecting the call to whichever of the mobile phone and the extension is answered first.

\* \* \* \* \*

UNITED STATES PATENT AND TRADEMARK OFFICE
CERTIFICATE OF CORRECTION

PATENT NO. : 6,633,636 B1
DATED : October 14, 2003
INVENTOR(S) : Von McConnell and Dorene G. Weiland It is certified that error appears in the above-identified patent and that said Letters Patent is hereby corrected as shown below:

<u>Title page,</u>
Item [75], Inventors, should read:
-- [75]   Von McConnell, Leawood, KS (US);
          Dorene G. Weiland, Lake Latawana,
          MO (US) --

Signed and Sealed this

Sixteenth Day of March, 2004

JON W. DUDAS
*Acting Director of the United States Patent and Trademark Office*